United States Patent
Hecht et al.

(10) Patent No.: US 10,468,017 B2
(45) Date of Patent: Nov. 5, 2019

(54) SYSTEM AND METHOD FOR UNDERSTANDING STANDARD LANGUAGE AND DIALECTS

(71) Applicant: GM GLOBAL TECHNOLOGY OPERATIONS LLC, Detroit, MI (US)

(72) Inventors: Ron M Hecht, Raanana (IL); Yael Shmueli Friedland, Tel Aviv (IL); Ariel Telpaz, Givat Haim Meuhad (IL); Omer Tsimhoni, Bloomfield Hills, MI (US); Peggy Wang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 74 days.

(21) Appl. No.: 15/841,397

(22) Filed: Dec. 14, 2017

(65) Prior Publication Data

US 2019/0189113 A1    Jun. 20, 2019

(51) Int. Cl.
*G10L 15/07* (2013.01)
*G10L 15/01* (2013.01)
*G06F 11/07* (2006.01)
*G10L 17/24* (2013.01)

(52) U.S. Cl.
CPC .......... *G10L 15/075* (2013.01); *G06F 11/079* (2013.01); *G10L 15/01* (2013.01); *G10L 17/24* (2013.01)

(58) Field of Classification Search
CPC ....... G10L 15/075; G10L 15/22; G10L 15/26; B60R 16/0373; G01C 21/3608
See application file for complete search history.

(56) References Cited

U.S. PATENT DOCUMENTS

| | | | | |
|---|---|---|---|---|
| 5,865,626 A | * | 2/1999 | Beattie | G09B 19/04 434/185 |
| 2003/0229497 A1 | * | 12/2003 | Wilson | G09B 5/04 704/270.1 |
| 2004/0143374 A1 | * | 7/2004 | Horst | B61C 17/12 701/19 |
| 2007/0038436 A1 | * | 2/2007 | Cristo | G06F 17/273 704/9 |
| 2010/0333163 A1 | * | 12/2010 | Daly | H04N 5/4403 725/133 |
| 2013/0173270 A1 | * | 7/2013 | Han | G10L 15/22 704/275 |
| 2014/0012579 A1 | * | 1/2014 | Ganong, III | G10L 15/01 704/257 |
| 2015/0243278 A1 | * | 8/2015 | Kibre | G10L 15/075 704/243 |
| 2018/0122365 A1 | * | 5/2018 | Kunitake | G10L 15/187 |
| 2018/0286390 A1 | * | 10/2018 | Sreedhara | G10L 15/22 |
| 2019/0073994 A1 | * | 3/2019 | Parthasarathy | G10L 13/08 |

* cited by examiner

*Primary Examiner* — Paras D Shah
(74) *Attorney, Agent, or Firm* — Lorenz & Kopf, LLP

(57) ABSTRACT

Methods and systems are provided for a speech system of a vehicle. In particular, a method is taught for associating a speech utterance with a voice command in response to a failed voice control attempt followed by a successfully voice control attempt.

18 Claims, 5 Drawing Sheets

SYSTEM AND METHOD FOR UNDERSTANDING STANDARD LANGUAGE AND DIALECTS

TECHNICAL FIELD

The technical field generally relates to speech systems, and more particularly relates to methods and systems for understanding utterance intent for speech systems of a vehicle.

BACKGROUND

Vehicle speech recognition systems perform speech recognition on speech uttered by occupants of the vehicle. The speech utterances typically include commands that control one or more features of the vehicle or other systems that are accessible by the vehicle such as but not limited to, vehicle control, telecommunications and entertainment. The speech dialog systems utilize generic dialog techniques using a small vocabulary for each language supported. This small vocabulary may not account for different dialects. This problem is further compounded in that some users may use a dialect, a standard language or a mix of dialects interchangeably.

Accordingly, it is desirable to provide methods and systems for identifying and tracking dialects and associating dialects with standard language vocabularies. Accordingly, it is further desirable to provide methods and systems for managing and adapting a speech dialog system based on associating dialects with standard language vocabularies. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for a speech system of a vehicle. In one embodiment, the method includes for a speech system of a vehicle comprising receiving a first speech utterance, generating a first utterance signature from the first speech utterance, failing to associate the first utterance signature with a command, receiving a second speech utterance, generating a second utterance signature from a second speech utterance, determining an association between the second utterance signature with a first command, associating the first utterance signature with the first command in response to a time duration between the first speech utterance and the second speech utterance and the determination of the association between the second utterance signature with the first command, and executing the first command in response to receiving the first speech utterance.

In another embodiment, an apparatus is taught comprising a microphone for receiving a first utterance and a second utterance, a controller for performing a command, a memory for storing a speech command database, and a processor for associating the second utterance with the command, for generating a control signal to instruct the controller to perform the command, the processor further operative to associate with first utterance with the command in response to a time interval between the first utterance, the second utterance and the performance of the first command; and updating the speech command database indicative of the association between first utterance with the command.

In another embodiment, a method of speech processing is taught comprising receiving a first speech utterance, receiving a second speech utterance, associating the second speech utterance with a first command, performing the first command, and associating the first speech utterance with the first command in response to a time interval between the first speech utterance and the performance of the first command, and updating a database with the association between the first speech utterance and the first command.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
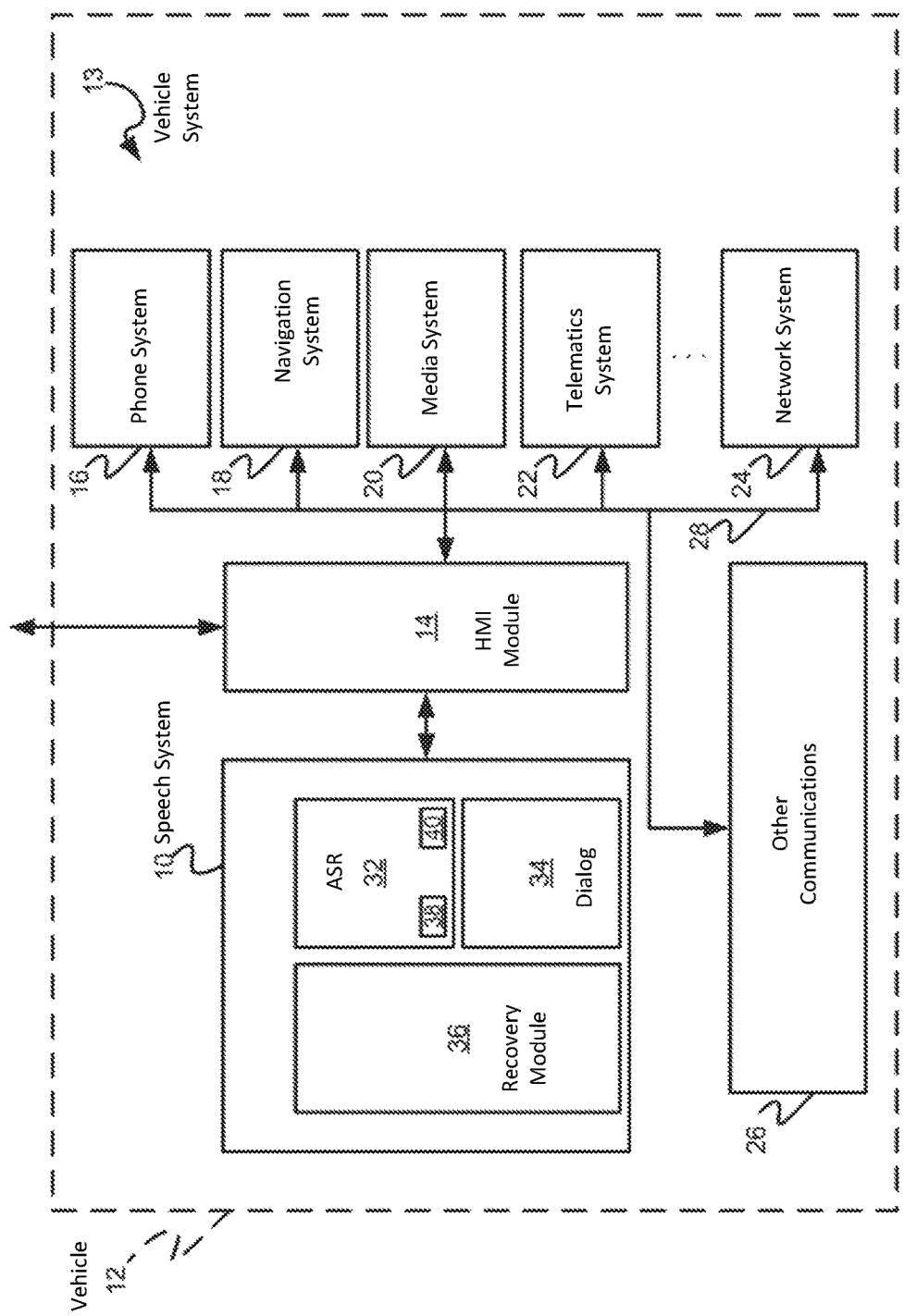
FIG. 1 is a functional block diagram of a vehicle that includes a speech system in accordance with various exemplary embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

In accordance with exemplary embodiments of the present disclosure a speech system 10 is shown to be included within a vehicle 12. In various exemplary embodiments, the speech system 10 provides speech recognition and/or a dialog for one or more vehicle systems through a human machine interface module (HMI) module 14. Such vehicle systems may include, for example, but are not limited to, a phone system 16, a navigation system 18, a media system 20, a telematics system 22, a network system 24, or any other vehicle system that may include a speech dependent application. As can be appreciated, one or more embodiments of the speech system 10 can be applicable to other non-vehicle systems having speech dependent applications and thus, is not limited to the present vehicle example.

The speech system 10 communicates with the multiple vehicle systems 16-24 through the HMI module 14 and a communication bus and/or other communication means 26 (e.g., wired, short range wireless, or long range wireless). The communication bus can be, for example, but is not limited to, a CAN bus.

The speech system 10 includes a speech recognition engine (ASR) module 32 and a dialog manager module 34. As can be appreciated, the ASR module 32 and the dialog manager module 34 may be implemented as separate systems and/or as a combined system as shown. The ASR module 32 receives and processes speech utterances from the HMI module 14. Some (e.g., based on a confidence threshold) recognized commands from the speech utterance are sent to the dialog manager module 34. The dialog manager module 34 manages an interaction sequence and prompts based on the command. In various embodiments, the speech system 10 may further include a text to speech engine (not shown) that receives and processes text received from the HMI module 14. The text to speech engine generates commands that are similarly for use by the dialog manager module 34.

In various exemplary embodiments, the speech system 10 further includes a signature engine module 40. The signature engine module 30 receives and processes the speech utterances from the HMI module 14. Additionally or alternatively, the signature engine module 40 receives and processes information that is generated by the processing performed by the ASR module 32 (e.g., features extracted by the speech recognition process, word boundaries identified by the speech recognition process, etc.). The signature engine module 40 may identify and save unrecognized speech commands and build a database of unrecognized speech commands and associated data based on the speech utterances.

Figure 2:
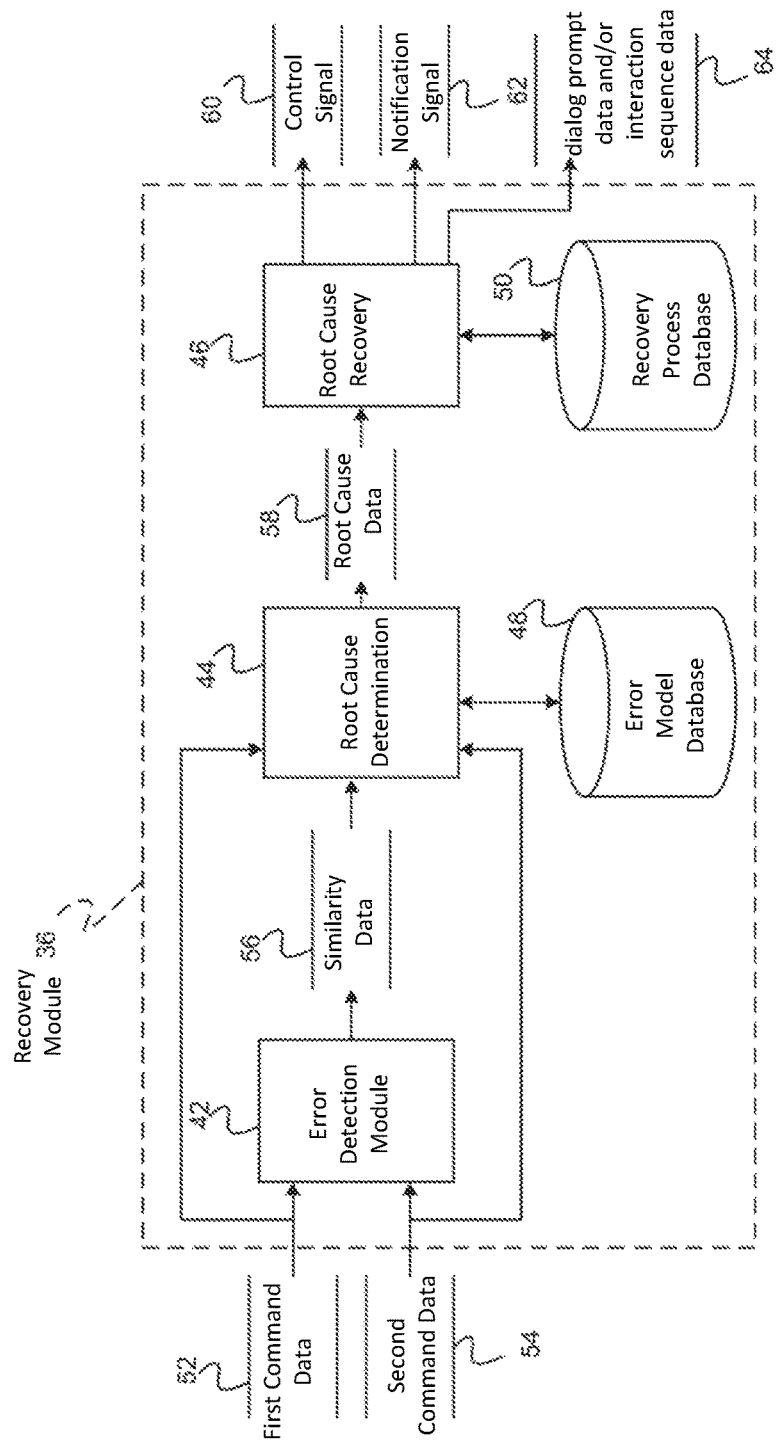
FIG. 2 is a dataflow diagram illustrating a signature engine of the speech system in accordance with various exemplary embodiments.

Referring now to FIG. 2, a dataflow diagram illustrates the root cause detection and recovery module 36 in accordance with various embodiments. As can be appreciated, various embodiments of error detection and recovery module 36, according to the present disclosure, may include any number of sub-modules. For example, the sub-modules shown in FIG. 2 may be combined and/or further partitioned to similarly identify a root cause in errors and to recover from the root cause. In various embodiments, the data received by the root cause detection and recovery module 36 may be received from the ASR module 32, or other modules of the speech system 10. In various exemplary embodiments, the error detection and recovery module 36 includes an error detection module 42, a root cause determination module 44, a root cause recovery module 46, an error model database 48, and a recovery processes database 50.

The error model database 48 stores one or more error models. The error models include one or more rules for processing command data to determine a root cause. The recovery processes database 50 stores one or more recovery processes. The recovery processes include one or more steps for recovering from an error given a root cause.

The error detection module 42 receives as input first command data 52 corresponding to the first recognized command from the first language model and second command data corresponding to the second command data 54 from the second language model. The error detection module 42 compares the first command data 52 and the second command data 54. If sufficient differences exist (e.g., a threshold number of differences has been identified), then the error detection module 42 determines that an error is present. When an error is present, the error detection module 42 compares the first command data 52 and the second command data 54 and generates similarity data 56 indicating the similarities and/or dissimilarities in the two commands.

The root cause determination module 44 receives as input the first command data 52, the second command data 54, and the similarity data 56. The root cause determination module 44 processes the first command data 52 and the second command data 54 based on the similarity data 56. For example, the root cause determination module 44 retrieves from the error model database 48 the error model defining one or more rules associated with the similarities and/or dissimilarities identified by the similarity data 56. The root cause determination module 44 then processes the first command data 52 and the second command data 54 using the one or more rules to identify the root cause. The root cause determination module 44 generates root cause data 58 based thereon.

The root cause recovery module 46 receives as input the root cause data 58. Based on the root cause data 58, the root cause recovery module 46 retrieves a recovery process from the recovery processes database 50 and executes the recovery process. In various embodiments, if multiple recovery processes are provided for a particular root cause, the root cause recovery module 46 selects a recovery process to be used based on a priority scheme. For example, the priority scheme may indicate that a recovery process that does not require user interaction may be selected first and a recovery processes requiring user interaction may be selected thereafter (e.g., if the first recovery process does not allow for recovery) based on a level of interaction (e.g., those recovery process having a minimal interaction being selected first, and so on).

In various embodiments, the recovery process, when executed by the root cause recovery module 46 generates one or more control signals 60 to one or more vehicle systems 13 to cause the vehicle system 13 to recover from the error. For example, the recovery process may generate one or more control signals 60 to a short range network system to cause the short range communication to obtain a contact list from a paired device. As can be appreciated, other control signals can be generated as the disclosure is not limited to the present examples. In various embodiments, the recovery process, when executed by the root cause recovery module 46, generates one or more notification signals 62 to cause a vehicle system to notify the user of the root cause. For example, the recovery process may generate one or more notification signals 62 to the media system 20 to cause a message to be displayed by a display device.

In various embodiments, the recovery process, when executed by the root cause recovery module 46, generates dialog prompt data and/or interaction sequence data 64 that is received by the dialog manager module 34. For example, the recovery process may generate dialog prompts that are used by the dialog manager to communicate the root cause and/or error to the user via the speech system 10. As can be appreciated, in various embodiments, the recovery process can generate any combination of control signals, notification signals, and/or dialog prompt data and/or interaction sequence data 64 to recover from the error based on the determined root cause.

As can be appreciated, this approach is merely exemplary. Other approaches for generating the user signature are contemplated to within the scope of the present disclosure. Thus, the disclosure is not limited to the present example.

Figure 3:
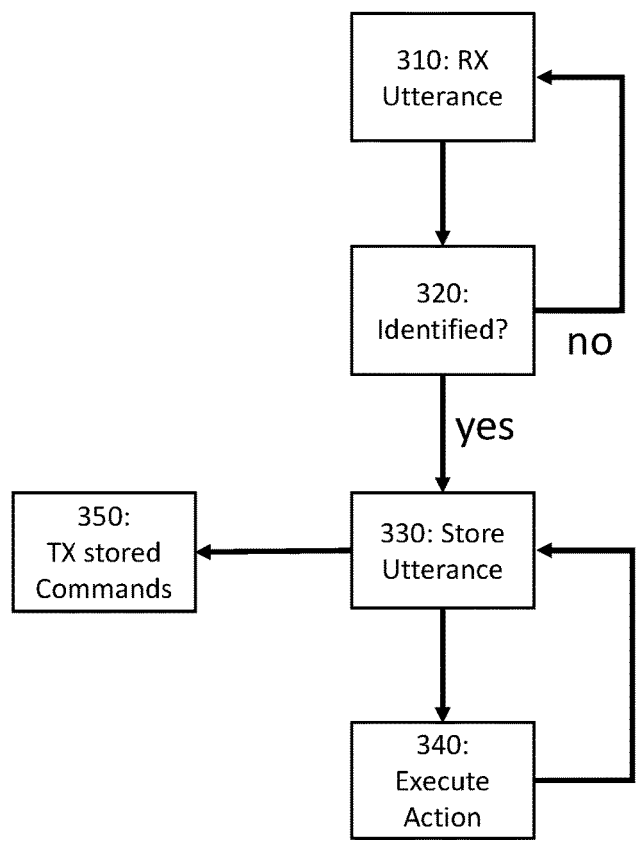
FIG. 3 is an exemplary utterance detection workflow 300 according to an exemplary embodiment.

Referring now to FIG. 3 an exemplary utterance detection workflow 300 according to an exemplary embodiment is shown. An input interface 310 is first operative to receive a speech utterance. The speech utterance is coupled to a common language decoder 320 wherein the speech utterance is either identified or not identified. If the speech utterance is not identified, the workflow stores the unidentified speech utterance in a memory, with optionally a time indicator, and returns to wait for a subsequent speech utterance at the input interface 310. If the speech utterance is recognized, the workflow stores the speech utterance 330 in a memory or other appropriate storage medium.

After a speech utterance is recognized, the system is then operative to execute the actions associated with the speech utterance 340. The workflow then sends a request to report all action in the next predetermined time interval which is returned to the utterance storage memory 330 or the like. The next predetermined time interval may be 10 seconds to 2 minutes or the like.

The time interval is selected to facilitate an identified speech utterance by a user after an unidentified speech utterance is attempted. Thus, if a user speaks a command using a dialect and then repeats the command using a standard phrase, the method may assume that the unidentified speech utterance is related to the identified speech utterance. After predetermined period of time or in response to a request, the utterance storage memory 350 may operative to transmit the stored undetected commands and associated subsequent actions to a server for offline analysis of the undetected commands.

Figure 4:
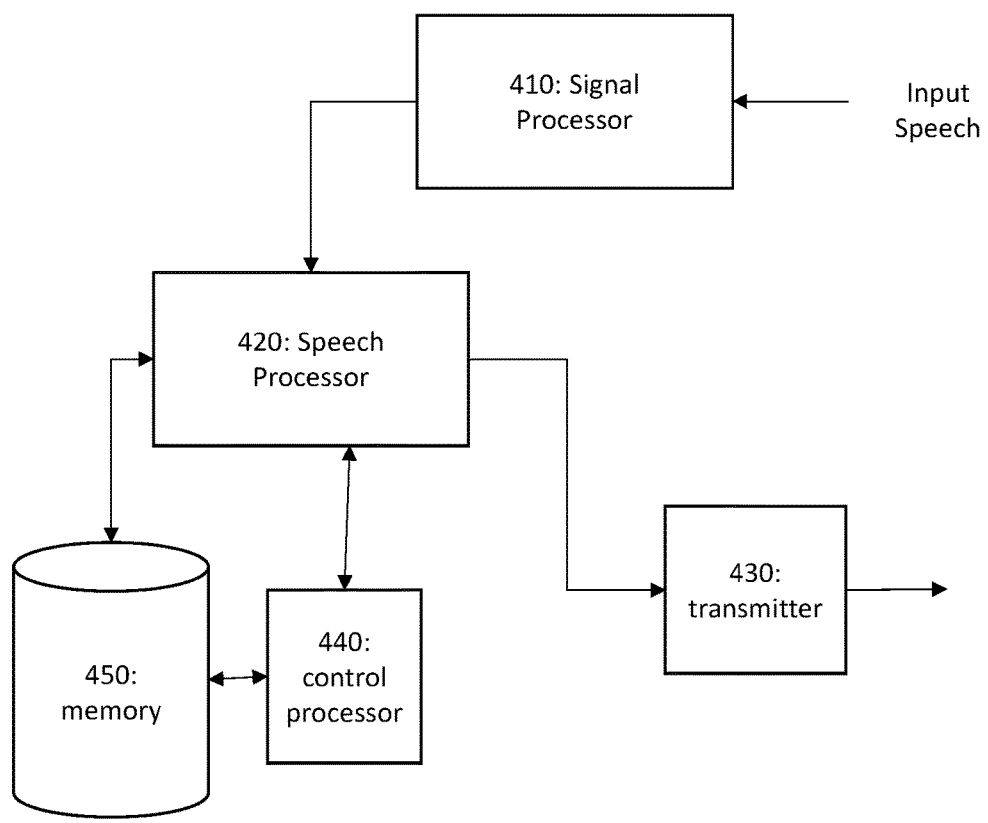
FIG. 4 is an exemplary apparatus for understanding standard language and dialects.

Turning now to FIG. 4, an exemplary apparatus for processing and understanding standard language and dialects 400 is shown. The input speech may be received by and coupled to a front end signal processor 410. The front end signal processor may operative to amplify a received speech utterance signal and filter the received speech signal in order to yield a processed speech utterance signal that is free from background noise and other spurious signals. The front end signal processor 410 may further include an analog to digital converter in order to convert the processed analog audio signal into a digital signal.

The processed speech utterance signal is then coupled to a speech processor 420 linguistic decoding and search algorithm. The speech processor 420 is operative to examine the processed speech utterance signal, which may include speech feature vectors and the like. In performing the speech processing, the speech processor 420 may draw information from a memory 450 which may store acoustic models, lexicon and language models. The speech processor 420 may then generate a speech utterance signature in response to the processed speech utterance signal. The speech processor may compare the processed speech signal to known speech utterance signatures in order to associate a command with the speech utterance signature. The speech processor 420 is then operative to generate a control signal in response to the affirmative comparison and couple this control signal to the control processor 440. The speech processor 420 may be further operative to transmit, via a transmitter 430, the stored undetected commands and associated subsequent actions to a server for offline analysis of the undetected commands. The control processor 440 is operative to generate vehicle control signals in response to the control signals from the speech processor 420.

Figure 5:
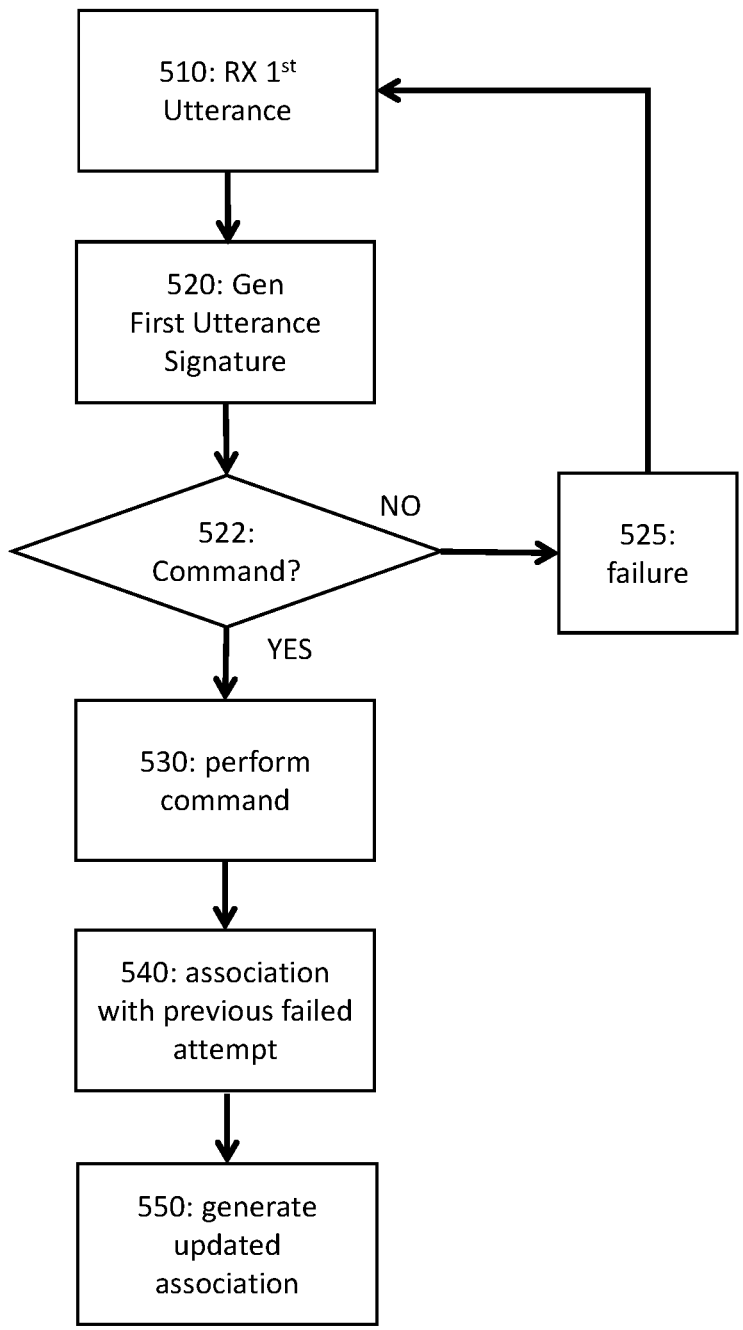
FIG. 5 is an exemplary method for understanding standard language and dialects.

Turning now to FIG. 5, an exemplary method for understanding standard language and dialects 500 is shown. The method may be performed in a vehicular infotainment system, or may be performed by a remote server. The method is first operative to receive a first speech utterance 510. This speech utterance may be received through a microphone on a vehicle infotainment system or may be received via network transmission after being transmitted by a vehicle or other system.

The method is then operative to generate a first utterance signature from the first speech utterance 520. This may be performed by the vehicle infotainment system, a processor within the vehicle as described previously, or may be performed by a remote server.

The method then determines whether there is a command associated with the first utterance signature 522. If there is a command associated with the with first utterance signature, the method is then operative to perform the command 530 associated with the first utterance signature. If the method fails to associate the first utterance signature with a command, the method then save data to a memory or the like, indicating the failure 525 and the returns to a wait state to receive a further speech utterance 510.

The method may then operative to receive a second speech utterance 510. The method is then operative to generate a second utterance signature from the second speech utterance 520. The method then determines whether there is a command associated with the second utterance signature 522. If there is a command associated with the with second utterance signature, the method is then operative to perform the command 530 associated with the second utterance signature. If the method fails to associate the second utterance signature with a command, the method then save data to a memory or the like indicating the failure 525 and the returns to a wait state to receive a further speech utterance 510.

After successfully generating the command 530, the method determines an association with a previous failed association attempt 540. An association may be determined by relating the data indicating the failure with the time elapsed between the failure and the successful association, the method may then generate an update associating the first utterance signal with the vehicle action control in response to the second indication 550. The update may be made in response to a predetermined time interval, such as the second speech utterance was received within 30 seconds of the failed command association. The update may be made in response to a plurality of failed commands and associations. The update may be forwarded to a server, to other vehicles within a geographical region or the like. The second command may not be limited to a speech command, but may occur in other modality, touch of screen or button, or eye gaze. This information may be used regarding the displayed screen to support the linkage between two commands. The exemplary system is system to gap dialect differences were there is a common dialect that is known by all however have fewer native speakers. In such case, some systems are trained only on the common dialect and it is desirable to adapt to other dialects. The system and method are applicable to other applications and are not limited to this exemplary embodiment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for a speech system of a vehicle, comprising:
   receiving a first speech utterance at a front end processor to generate a processed speech utterance signal;
   generating, by a speech processor, a first utterance signature from the processed first speech utterance;
   failing to associate the first utterance signature with a command;
   receiving a second speech utterance;
   generating a second utterance signature from a second speech utterance;

determining an association between the second utterance signature with a first command, wherein the first speech utterance is spoken in a first dialect and the second speech utterance is spoken in a second dialect;

associating the first utterance signature with the first command in response to a time duration between the first speech utterance and the second speech utterance and the determination of the association between the second utterance signature with the first command; and executing the first command in response to receiving the first speech utterance; and transmitting the association of the first utterance signature with the first command to a server, wherein the server forwards the association of the first utterance signature with the first command to other vehicles within a geographical region associated with the first dialect.

2. The method of claim 1 wherein associating the first speech utterance signature with the first command is performed in response to receiving the second speech utterance within ten seconds of failing to associate the first utterance signature with the command.

3. The method of claim 1 further comprising generating an indicator in response to receiving the second speech utterance after failing to associate the first utterance signature with the command, and wherein associating the first utterance signature with the first command is made in response to the indicator and receiving the second speech utterance after failing to associate the first utterance signature with the command.

4. The method of claim 1 wherein associating the first utterance signature with the first command is made in response to receiving the second speech utterance after failing to associate the first utterance signature with the command.

5. An apparatus comprising:
a microphone for receiving a first utterance and a second utterance wherein the first utterance is spoken in a first dialect and the second utterance is spoken in a second dialect;
a controller for performing a command;
a memory for storing a speech command database;
a processor for associating the second utterance with the command, for generating a control signal to instruct the controller to perform the command, the processor further operative to associate with first utterance with the command in response to a time interval between the first utterance, the second utterance and the performance of the first command and updating the speech command database indicative of the association between first utterance with the commands; and
transmitting the association of the first utterance with the command to a server, wherein the server forwards the association of the first utterance with the command to other vehicles within a geographical region associated with the first dialect.

6. The apparatus of claim 5 further comprising attempting to associate the first utterance with at least one of a plurality of commands and generating a failure indicator in response to failing to associate the first utterance with at least one of a plurality of commands.

7. The apparatus of claim 5 wherein the second utterance is received within 30 seconds of the first utterance.

8. The apparatus of claim 5 wherein the updating the speech command database is performed in response to determining a plurality of associations between the first utterance and the command.

9. The apparatus of claim 5 wherein the first utterance and the second utterance have the same meaning.

10. The apparatus method of claim 5 wherein the speech command database is a speech system for a vehicle control system.

11. A method of speech processing, comprising:
receiving a first speech utterance;
receiving a second speech utterance wherein the first utterance is spoken in a first dialect and the second utterance is spoken in a second dialect;
associating, by a speech processor, the second speech utterance with a first command;
performing the first command by a vehicle controller;
associating, by the speech processor, the first speech utterance with the first command in response to a time interval between the first speech utterance and the performance of the first command;
updating a database, on a memory, with the association between the first speech utterance and the first command; and
transmitting the association of the first speech utterance with the first command to a server, wherein the server forwards the association of the first speech utterance with the first command to other vehicles within a geographical region associated with the first dialect.

12. The method of claim 11 wherein the database is a speech system for a vehicle control system.

13. The method of claim 11 wherein the database is updated with data indicative of the first speech utterance.

14. The method of claim 11 wherein the updating the database is performed in response to determining a plurality of association between the first speech utterance and the first command.

15. The method of claim 11 wherein the first speech utterance and the second utterance have the same meaning.

16. The method of claim 11 wherein the first speech utterance is spoken in a first dialect and the second speech utterance is spoken in a standard language.

17. The method of claim 11 wherein the database is a speech system for a vehicle control system.

18. The method of claim 11 wherein the database is updated with data indicative of the first speech utterance.

* * * * *